United States Patent [19]

Mitani et al.

[11] Patent Number: 4,517,344
[45] Date of Patent: May 14, 1985

[54] PROCESS FOR POLYMERIZATION OF ACRYLATE OR METHACRYLATE

[75] Inventors: Toragoro Mitani, Takasago; Hideo Yasui, Kobe; Hisashi Morikawa, Kakogawa, all of Japan

[73] Assignee: Kanegafuchi Kagaku Kogyo Kabushiki Kaisha, Osaka, Japan

[21] Appl. No.: 634,067

[22] Filed: Jul. 25, 1984

Related U.S. Application Data

[63] Continuation-in-part of Ser. No. 540,155, Oct. 7, 1983, abandoned.

[30] Foreign Application Priority Data

Oct. 12, 1982 [JP] Japan .............................. 57-179575
Jun. 20, 1984 [JP] Japan .............................. 59-126990

[51] Int. Cl.$^3$ ............................................. C08F 2/00
[52] U.S. Cl. ........................................ 526/62; 526/319; 526/328; 526/328.5; 526/329.7
[58] Field of Search ................................... 526/62

[56] References Cited

U.S. PATENT DOCUMENTS

| | | | |
|---|---|---|---|
| 4,024,330 | 5/1977 | Morningstar et al. | 526/62 |
| 4,220,743 | 9/1980 | Englin | 526/62 |
| 4,464,516 | 8/1984 | Eberl et al. | 526/62 |

Primary Examiner—Joseph L. Schofer
Assistant Examiner—S. Babajko
Attorney, Agent, or Firm—Antonelli, Terry & Wands

[57] ABSTRACT

In a process of emulsion-polymerization in a polymerization system containing an acrylate or a methacrylate monomer at least 60%; the improvement which comprises carrying out the emulsion polymerization in a polymerization vessel having a film of a quinone-amine compound of not less than 3000 in average molecular weight on the inner vessel wall, said quinone-amine compound being prepared by addition-reacting an aromatic quinone and an aromatic diamine in a solvent medium having a solubility parameter of 9.0 to 12.2. According to the process, the polymer scale deposition can be prevented in the acrylate or methacrylate polymerization system.

12 Claims, 1 Drawing Figure

PROCESS FOR POLYMERIZATION OF ACRYLATE OR METHACRYLATE

CROSS-REFERENCE TO RELATED APPLICATION

This is a continuation-in-part of application Ser. No. 540,155 filed on Oct. 7, 1983 abandoned.

BACKGROUND OF THE INVENTION

The present invention relates to a process for emulsion-polymerizing an acrylate or a methacrylate (hereinafter referred to as "(meth)acrylate"), more particularly relates to a process of polymerization capable of preventing scale deposition by carrying out an emulsion-polymerization of (meth)acrylate monomers in an aqueous medium within a polymerization vessel on an inner surface of which a film of an aromatic quinone-amine compound which is insoluble in the monomers is formed.

An emulsion polymerization using a (meth)acrylate monomer is popularly applied to a process for preparing an acrylonitrile-butadiene-styrene copolymer (ABS) or a methyl methacrylate-butadiene-styrene copolymer(MBS). In such a process, the polymerization is carried out in a manner of graft polymerization to a butadiene rubber latex. As a result of the polymerization, since the formed polymer scale is adhesive, the scale is hardly removed from a surface of a polymerization vessel.

The deposition of the polymer scale is assumed to occur in the following manner. The (meth)acrylate monomers are dissolved in water, and then polymerized in water, which makes the latex unstable. In addition, since the (meth)acrylate monomers are hydrolyzed to acidify the polymerization system weakly, agglomeration of the latex is promoted. For preventing the latex from the agglomeration, a proper emulsifier is selected. It is very difficult, however, to carry out the polymerization in a stable state of the latex, because the quality of the produced polymer becomes degraded by the increase of the amount of the emulsifier. Therefore the partial agglomeration of the latex cannot be avoided.

The agglomerated latex is dissolved in the (meth)acrylate monomers to increase in stickness. The sticky agglomerated latex is adhered on surfaces of various parts in a polymerization vessel, and then the (meth)acrylate monomers contained in the latex are polymerized there to form a tough polymer scale deposit.

This causes many defects such as decrease in heat transfer efficiency through the inner wall of the vessel, decrease in yield, deterioration of products due to the admixing of the pealed scales, and reduction in oparating rate of the vessel due to labors and time required for removing the scales from the surface.

There hitherto have been proposed various processes for preventing polymer scale deposition, for instance, a process in which a polymerization vessel is prevented from scale deposition by previously applying a quinone-amine compound to the surfaces of the vessel to form a film of the compound, and then carrying out the polymerication. The process is applicable to a dispersion polymerization of a halogenated vinyl monomer such as vinyl chloride or a monomer mixture of the hologenated vinyl monomer containing a small amount of a copolymerizable monomer therewith.

In a polymerization system in which the amount of (meth)acrylate monomers become predominant in a course of the polymerization, however, it has been thought that the quinone-amine compound film is not effective for the prevention of the polymer scale deposition, because a solubility power of the (meth)acrylate monomers is extremely larger than that of the halogenated vinyl monomer. Namely, the quinone-amine compound film used for the polymerization of the halogenated vinyl monomer system is partially or wholly dissolved in the (meth)acrylate monomers. As a result, there arise defects that the scale deposition preventing effect is remarkably decreased and that the product is contaminated by the dissolved quinone-amine compound and is colored. The solubility power of the (meth)acrylate monomers is larger than that of an aromatic monomer such as styrene or α-methylstyrene.

In general, the solubility power of the (meth)acrylate monomers is lowered in the presence of a halogenated vinyl monomer which is a poor solvent for the quinone-amine compound. However, when the (meth)acrylate monomers exist in a monomer mixture at not less than 60% (% by weight, hereinafter the same), the above quinone-amine compound is almost dissolved in the monomer mixture, and thus the scale deposition preventing effect cannot be obtained. Accordingly the conventional quinone-amine compound used for the dispersion polymerization system of the halogenated vinyl monomer cannot be employed in the emulsion polymerization system containing the (meth)acrylate monomers in an amount of not less than 60%.

From the above-mentioned reason and the fact that an industrial process concerning the polymerization of the (meth)acrylate monomers are usually carried out in the above-mentioned condition where the amount of the (meth)acrylate monomers becomes not less than 60%, there is no useful scale deposition preventing agent for the emulsion polymerization of the (meth)acrylate monomer system.

As a result of the present inventors' study for improving a scale deposition preventing agent useful in the (meth)acrylate monomer system, it has been found that a quinone-amine compound prepared under the specific condition has an excellent scale deposition preventing effect in the (meth)acrylate monomer system, and then the present invention has been completed.

SUMMARY OF THE INVENTION

In accordance with the present invention, there is provided a process for emulsion-polymerizing an acrylate or a methacrylate monomer alone, a mixture thereof or a mixture of an acrylate or a methacrylate monomer as a main component and other copolymerizable monomers in the presence of water, an emulsifier and a polymerization initiator soluble in water or the monomers, wherein the amount of said acrylate monomer, methacrylate monomer or mixture thereof becomes not less than 60% by weight of the monomer mixture in the course of the emulsion polymerization, which is improved in that the emulsion polymerization is carried out in a polymerization vessel having a film on an inner surface thereof and on surfaces of attached instruments within the vessel, said film being formed by applying a solution of an aromatic quinone-amine compound having an average molecular weight of not less than 3,000 in an organic solvent, said quinone-amine compound being prepared by subjecting an aromatic diamine and an aromatic quinone to addition reaction in an organic solvent medium having a solubility parameter (hereinafter referred to as "sp") of 9.0 to 12.2 alone, a mixture thereof or a mixed medium of said organic solvent medium with an alcohol in amount of the same or less than the weight of the organic solvent medium.

According to the process of the present invention, the emulsion polymerization of the (meth)acrylate monomer system can be carried out without forming the polymer scale deposit.

DETAILED DESCRIPTION

Figure 1:
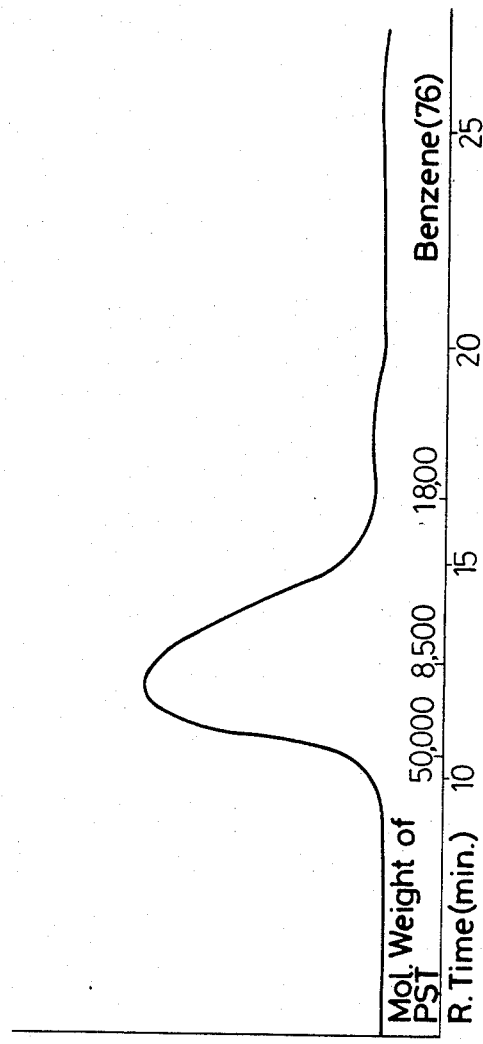
FIG. 1 shows a chart obtained in the analysis as to the quinone-amine compound prepared in Preparation Example 1 by means of gel permeation chlomatography.

The scale deposition preventing agent used in the present invention is the quinone-amine compound having an average molecular weight of not less than 3000 which is prepared from an aromatic quinone and an aromatic diamine by means of addition reaction under the specific conditions as mentioned above.

Examples of the aromatic quinones are, for instance, benzoquinone, naphthoquinone, phenanthraquinone, and the like. Furthermore, substituted quinone derivatives having on the aromatic ring at least one substituent such as chlorine atom, bromine atom, methyl group, amino group, an alkoxy group or hydroxyl group may be also employed. From a viewpoint of reactivity, an aromatic quinone having benzene ring, naphthalene ring or phenanthrene ring is preferably employed.

Examples of the aromatic diamines are, for instance, phenylenediamine, diaminonaphthalene, diaminoacridine, diaminopyridine, diaminopyrimidine, diaminofluorene, diaminoazobenzene, diaminobenzidine, diaminodiphenylamine, diaminotoluene, and substituted amine derivatives thereof having on the aromatic ring a substituent such as an alkyl group, an aryl group, an alkoxy group, halogen atom, hydroxyl group, mercapto group or nitro group. From a viewpoint of reactivity, an aromatic diamine having benzene ring or naphtalene ring is preferably employed. It should be noted that the aromatic diamine having benzene ring must be carefully handled becuase many of the quinone-amine compounds prepared from the diamine have a carcinogenic activity regardless of a kind of the aromatic quinone.

The process of the present invention is applied to the above-mentioned polymerization system, i.e. the emulsion polymerization system in which the amount of the (meth)acrylate monomers becomes not less than 60% of the monomer mixture in the course of the polymerization. For using in such polymerization system, it is necessary that the quinone-amine compound has an average molecular weight of not less than 3000. When the average molecular weight of the quinone-amine compound is less than 3000, the compound is partially or wholly dissolved in the (meth)acrylate monomer. As a result, not only the desired effect cannot be obtained, but also the quality of the product deteriorates. The molecular weight of quinone-amine compound need be varied according to polymerization conditions. For instance, the molecular weight of the compound should be made large in case of increasing the amount of the (meth)acrylate monomers or in case where the contamination of the product with the dissolved quinone-amine compound must be avoided, because the solubility power of the monomer mixture becomes large as the increase in amount of the (meth)acrylate monomers.

In the present invention it is important to select the solvent medium used in the preparation of the quinone-amine compound from viewpoints of reaction rate and yield as well as control of the molecular weight of the quinone-amine compound. The solvent medium must have an sp value of 9.0 to 12.2, preferably has a dielectric conductivity ($\epsilon$) of not less than 7. Preferable solvent medium is a polar non-proton solvent. Examples of the solvent media are, for instance, tetrahydrofuran (sp=9.32, $\epsilon$=7.58, hereinafter referred to as "THF"), dimethylformamide (sp=12.0, $\epsilon$=36,71, hereinafter referred to as "DMF"), dimethyacetamide (sp=11.0, $\epsilon$=37.8, hereinafter referred to as "DMAc"), acetonitrile (sp=11.9, $\epsilon$=37.5), acetone (sp=9.71, $\epsilon$=21.45), methyl ethyl ketone (sp=9.04, $\epsilon$=15.45), diethyl ketone (sp=10.03, $\epsilon$=17.00), methyl isobutyl ketone (sp=9.56, $\epsilon$=13.11), methyl n-butyl ketone (sp=9.92, $\epsilon$=12.2), methyl n-propyl ketone (sp=9.98, $\epsilon$=15.1), dioxane (sp=9.73, $\epsilon$=2.21), a mixture thereof, and the like.

As mentioned above, the molecular weight of the quinone-amine compound can be controlled by selecting the solvent medium. In order to obtain a quinone-amine compound having a small molecular weight, an alcohol is added to the solvent medium. Preferable alcohol is methanol (sp=14.5) or ethanol (sp=12.7). It is necessary, however, that the amount of the alcohol must be the same or less than the weight of the solvent medium. The addition of the alcohol makes reaction time shorter and yield higher. The alcohol may be added either before or after the addition reaction. In order to obtain a quinone-amine compound having a large molecular weight, the addition reaction is carried out without using the alcohol, and then the compound having a lower molecular weight in the reaction product is removed with a proper solvent.

The quinone-amine compound used in the present invention can be obtained by precipitating and separating the reaction product. The precipitation of the product occurs as the increase of the molecular weight of produced quinone-amine compound. The desired molecular weight of the quinone-amine compound can be controlled by adding the alcohol or changing the solvent medium.

A preferred embodiment of the preparation of the quinone-amine compound is explained hereinbelow.

In the above-mentioned reaction medium, the aromatic quinone and the aromatic diamine are dissolved so that the amount of the aromatic quinone is 1 to 5 moles, preferably 1 to 3 moles to one mole of the aromatic diamine.

The addition reaction begins immediately and the color of the reaction mixture changes blackly. The reaction is continued at a temperature of about 10° to 70° C., preferably 30° to 50° C. with or without stirring, preferably without stirring until a crystal of the reaction product is precipitated. If desired, a reaction accelerator such as ferric chloride or the alcohol may be added. The precipitation of the reaction product usually begins after 30 days. The reaction time can be reduced by half with the reaction accelerator, and also can be shortened by adding the alcohol.

The precipitate of the reaction product is collected by filtration, washed with a solvent, preferably the reaction medium except the alcohol so that the washing solvent is not almost colored, and then dried under reduced pressure.

The applicable polymerization system of the obtained quinone-amine compound can be confirmed by determining a solubility of the quinone-amine compound for various monomer mixtures in the test polymerization systems prepared according to various practical polymerization systems.

In order to enhance the scale deposition preventing effect, hydrophilic property is given to the quinone-amine compound.

In general, when a lipophilic compound is applied to the surface of the vessel, a lipophilic monomer is easy to adhere to the surface, and then polymerized to form a polymer scale thereon. Accordingly, by giving the hydrophilic property to the compound, the compound exhibits the increased scale deposition preventing effect. This phenomenon is presumed that the surface of the vessel increases in wettability to water by applying the hydrophilic compound to form a water film thereon, whereby the polymerization on the surface is inhibited and the access of the produced polymer is also prevented. In order to obtain the hydrophilic property, it is necessary that the aromatic quinone-amine compound has a hydrophilic group such as —OH, —NH$_2$ or —NH—.

When the quinone-amine compound is subjected to reduction treatment, the hydrophilic property is far more enhanced. The quinone-amine compound can be reduced, for instance, by dissolving the compound in the solvent for application, which is explained hereinafter, in an amount of not less than 0.5%, adding thereto an aqueous solution of a reducing agent such as sodium hydrosulfite in an amount of 1 to 3 times the weight of the quinone-amine compound, and stirring at normal temperature under atmospheric pressure, or by adding the finely divided quinone-amine compound having a particle size of not more than about 150 μm to an aqueous solution of a reducing agent in an amount of ⅓ to 1 time the weight of the reducing agent, and stirring the mixture. A filtrate obtained by filtrating the reaction mixture in the former process is available as the solution of the scale deposition preventing agent, as it is. The reaction mixture obtained in the latter process is filtrated and the residue is dried under reduced pressure to give the reduced quinone-amine compound.

The quinone-amine compound is almost insoluble in water, alcohols, linier hydrocarbons, aromatic hydrocarbons, halogenated hydrocarbons and, of course, monomer mixtures to be polymerized.

The film of the quinone-amine compound may be formed, for instance, according to a process (a) in which a dispersion of the finely divided quinone-amine compound is applied, and then dried or molten; a process (b) in which a molten quinone-amine compound is applied; or a process (c) in which an organic solution prepared by dissolving the quinone-amine compound in an organic solvent is applied. However, since it is difficult to form a uniform and smooth film according to the process (a) and also the process (b) is difficult to be practiced in an industrial scale, there is employed in the present invention the process (c) in which the quinone-amine compound is dissolved in an organic solvent and applied to an inner surface of a polymerization vessel and to surfaces of attached instruments within the vessel such as mixing blades and baffle plates.

The following properties should be considered upon the selection of the solvent which dissolves the quinone-amine compound, i.e. scale deposition preventing agent.
(1) Large solubility for ensuring the desired thickness of the film formed on the surfaces
(2) Low boiling point for easy drying
(3) Small surface tension for uniform application on the surface However, it is not easy to find out a solvent satisfying the above all requirements.

As a result of the inventors' study relating to the solubility (1), it has been found out that an organic solvent having an sp value of 9.8 to 12.5 is preferably employed. Examples of such organic solvents are, for instance, a primery amide such as DMF or DMAc; a sulfoxide such as dimethylsulfoxide; a ketone such as acetone, methyl ethyl ketone, diethyl ketone or methyl n-propyl ketone; a nitrile compound such as acetonitrile; pyridine; morpholine; a mixture thereof; and the like. In a practical application the solvent is selected depending on a molecular weight of the quinone-amine compound, a concentration of the solution, safety handling, working procedure, and the like. When a solvent having a high boiling point must be used, it is preferred that an applied film is dried under reduced pressure by warming.

Though some of the solvent media used as the reaction medium in the preparation of the quinone-amine compound are the same as the solvents used in the application of the quinone-amine solution, the solvent medium or the mixed solvent medium used as the reaction medium is preferably selected so that the solubility power of the reaction medium is smaller than that of the solvent for the application.

When a concentration of the synthesized quinone-amine compound in the reaction medium becomes large to exceed the solubility, i.e. to be in supersaturation, the quinone-amine compound is precipitated. On the other hand, a concentration of the quinone-amine compound in the application solution is usually lower than that in the supersaturated condition during the preparation. Therefore, the same solvent can also be used in the preparation and the application. Accordingly, the reaction medium and the solvent for the application may be the same or different.

With respect to the surface tension (3), a uniform film is not formed unless a surface tension of the solvent can easily wet the surface. For instance, when a solution of the quinone-amine compound is applied to a stainless steel (SUS 304), the surface tension of the solvent must be below 30 dyne/cm. In case where the solvent having a large surface tension must be employed, the surface tension of the solvent should be lowered by adding a solvent having a small surface tension.

Examples of the solvents having a small surface tension are, for instance, methyl n-propyl ketone, amyl acetate, n-butanol, THF, ethanol, and the like an amount of which is 20 to 50% by volume to the solvent having a large surface tension. Further, the uniform application to a stainless steel can also be achieved by adding an organic acid such as thiosalicylic acid, benzoic acid, palmitic acid or stealic acid; a weakly acidic inorganic acid such as sulfamic acid; or a chelating agent such as disodium ethylenediaminetetraacetate in an amount of 0.1 to 0.3% of the weight of the scale deposition preventing agent. In any case, however, since the solubility of the mixed solvent is reduced somewhat rather than that of the solvent alone, the most profitable measure should be searched by an experiment.

An application amount of the scale deposition preventing agent on the surfaces within the vessel is generally in the range of 0.01 to 5 g/cm$^2$, preferably 0.1 to 1.0 g/m$^2$. The agent may be applied beyond 5 g/m$^2$ insofar as an influence on the polymerization system is allowably small. The applying solution of the agent can be applied by a spraying method, a brushing method, or the like.

The amount of the scale deposition preventing agent varies depending on a concentration of the agent in the applying solution. Namely, when the concentration is low, the applying solution must be applied several times because only a thinner film of the agent is formed at one application. In such a case, since the applying solution is floated in the vessel and falls down to stay in the bottom portion of the vessel on each application, a large amount of the solution is required. Moreover, a long time is required for the application and the drying, which makes a profitability reduced. Accordingly, it is preferable that a concentration of the scale deposition preventing agent in the solution is higher, usually not less than 0.5%, particularly 1.0 to 2.0%.

The polymerization system which is employed in the present invention is an emulsion polymerization system comprising the acrylate or the methacrylate monomer alone, a mixture thereof, or a mixture containing the (meth)acrylate monomer in an amount of not less than 60% of the monomer mixture in the course of the polymerization.

In general a polymerization vessel is charged with a monomer mixture according to the following method: a method in which a vessel is charged with the monomer mixture having a composition corresponding to the desired composition of the product, or a method in which an additional monomer mixture is added at one time or at several times or continuously when the polymerization reaction is proceeded to some extent. In the latter method, there is a case where an amount of the (meth)acrylate monomer is beyond 60% in the monomer mixture, even if a content of the (meth)acrylate units is below 60% in the polymer product. Such a case is also included in the present invention.

As mentioned above, the polymerization system employed in the present invention is the most difficult system to prevent the scale deposition. Therefore polymer scale deposition can be avoided in every emulsion polymerization system and dispersion polymerization system.

Examples of the (meth)acrylate monomers employed in the present invention are, for instance, an acrylate such as methyl acrylate, ethyl acrylate, butyl acrylate, octyl acrylate, dodecyl acrylate, cyclohexyl acrylate, $\beta$-hydroxyethyl acrylate, glycidyl acrylate, cyanoethyl acrylate or alkoxycarbonylmethyl acrylate; a methacrylate such as methyl methacrylate, ethyl methacrylate or butyl methacrylate, and the like. Examples of the other copolymerizable monomers employed with the above (meth)acrylate monomers are, for instance, a stryrene derivative such as styrene, $\alpha$-methylstyrene, orthochlorostyrene or vinyltoluene; a diolefine such as vinylnaphthalene, butadiene, isoprene or chloroprene; a nitrile derivative such as acrylonitrile or methacrylonitrile; vinyl acetate, vinyl chloride, vinylidene chloride; and the like.

Examples of the emulsifiers are, for instance, an anionic surfactant such as sodium lauryl sulfate, sodium stearate, sodium dodecylbenzenesulfonate, sodium palmitate, postassium oleate, potassium rhodinate, paraffine sulfonic acid ester or naphthalene sulfonic acid ester; a nonionic surfactant such as sorbitan monolaurate, polyoxyethylenealkyl ether or polyethyleneglycol monolaurate; and the like.

Examples of the polymerization initiators are, for instance, a water soluble persulphate such as potassium persulfate or ammonium persulfate; an oil soluble polymerization initiator such as cumenehydroperoxide, paramethanehydroperoxide, t-butylhydroperoxide, t-butylperoxiisopropyl carbonate or $\alpha,\alpha'$-azobisisobutyronitrile; a redox polymerization initiator, and the like.

If necessary, a polymerization activating agent such as a chain transfer agent or an electrolyte may be admixed.

The present invention is more particularly described and explained by means of the following Examples, in which all percents and parts are percents by weight and parts by weight, respectively, unless otherwise noted. It is to be understood that the present invention is not limited to the Examples and various changes and modifications may be made in the invention without departing from the spirit and scope thereof.

PREPARATION EXAMPLE 1

A reaction vessel was charged with 100 parts of THF, and then 15 parts of $\beta$-naphthoquinone and 5 parts of 1,8-diaminonaphthalene were added at 30° C. with stirring. The color of the reaction mixture was changed to reddish black when 1,8-diaminonaphthalene was added. After stopping stirring, the reaction was proceeded by allowing the reaction mixture to stand for 75 days at 30° C. The precipitated crystales were collected by filtration, repeatedly washed with THF until THF was not almost colored, and then dried under reduced pressure to give a quinone-amine compound used as a scale deposition preventing agent.

As a result of analyzing the quinone-amine compound obtained by gel permeation chromatography (hereinafter referred to as "GPC"), a chart shown in FIG. 1 was obtained. Calculating from FIG. 1, the average molecular weight of the compound was about 8500.

The measuring conditions were as follows:
Column: GPC AD-802/S×2: (Polystyrene gel available from SHOWA DENKO K. K. as the tradename of "SHODEX")
Carrier: 0.01 mLiBr/DMF:1.0 ml/min
Detector: Differential refractometer (RI×4).

PREPARATION EXAMPLE 2

A reaction vessel was charged with 200 parts of THF, and then 15 parts of p-benzoquinone and 5 parts of 1,8-diaminonaphthalene were added at 50° C. with stirring. The color of the mixture was changed to reddish black when 1,8-diaminonaphthalene was added. After stopping stirring, the reaction was proceeded by allowing the reaction mixture to stand for 60 days at 50° C. The precipitated crystals were collected by filtration, repeatedly washed with THF until THF was not almost colored, and then dried under reduced pressure to give a quinone-amine compound used as a scale deposition preventing agent. As a result of the measurement of GPC, the average molecular weight of the compound was about 8000.

PREPARATION EXAMPLES 3

A reaction vessel was charged with 200 parts of THF, and then 5 parts of p-benzoguinone and 5 parts of p-phenylenediamine were added at 30° C. with stirring. The color of the mixture was changed to reddish black when p-phenylenediamine was added. After stopping stirring, the reaction was proceeded by allowing the reaction mixture to stand for 30 days at 30° C. The precipitated crystals were collected by filtration, repeatedly washed with THF until THF was not almost colored, and then dried under reduced pressure to give a quinone-amine compound used as a scale deposition preventing agent. As a result of the measurement of GPC, the average molecular weight of the compound was about 7000.

PREPARATION EXAMPLES 4

A reaction vessel was charged with 50 parts of THF and 30 parts of methanol, and then 5 parts of β-naphthoquinone and 5 parts of 1,8-diaminonaphtalene were added at 30° C. with stirring. The color of the mixture was changed to reddish black when 1,8-diaminonaphthalene was added. After stopping stirring, the reaction was proceeded by allowing the reaction mixture to stand for 30 days at 30° C. The precipitated crystals were collected by filtration, repeatedly washed with THF until THF was not almost colored, and then dried under reduced pressure to give a quinone-amine compound used as a scale deposition preventing agent. As a result of the measurement by GPC, the average molecular weight of the compound was about 6000.

PREPARATION EXAMPLE 5

A reaction vessel was charged with 100 parts of THF, and then 1 parts of 9,10-phenathrenequinone and 1 parts of 1,2-diaminonaphthalene were added at 30° C. with stirring. The color of the mixture was changed to reddish black when 1,2-diaminonaphthalene was added. After stopping stirring, the reaction was proceeded by allowing the reaction mixture to stand for 120 days at 30° C. The precipitated crystals were collected by filtration, repeatedly washed with THF until THF was not almost colored, and then dried under reduced pressure to give a quinone-amine compound used as a scale deposition preventing agent. As a result of the measurement by GPC, the average molecular weight of the compound was about 10000.

PREPARATION EXAMPLE 6

A reaction vessel was charged with 90 parts of acetone and 90 parts of ethanol, and then 3 parts of β-naphthoquinone and 3 parts of 1,8-diaminonaphthalene were added at 20° C. with stirring. The color of the mixture was changed to reddish black when 1,8-diaminonaphthalene was added. After stopping stirring, the reaction was proceeded by allowing the reaction mixture to stand for 60 days at 20° C. The precipitated crystals were collected by filtration, repeatedly washed with acetone until acetone was not almost colored, and then dried under reduced pressure to give a quinone-amine compound used as a scale deposition preventing agent. As a result of the measurement by GPC, the average molecular weight of the compound was about 4000.

PREPARATION EXAMPLE 7

A reaction vessel was charged with 50 parts of THF and 45 parts of methanol, and then 5 parts of β-naphthoquinone and 5 parts of 1,8-diaminonaphthalene were added at 30° C. with stirring. The color of the mixture was changed to reddish black when 1,8-diaminonaphthalene was added. After stopping stirring, the reaction mixture was allowed to stand for 15 days at 30° C., and then 5 parts of ferric chloride was added to the reaction mixture to proceed the reaction for 15 days with stirring. The precipitated crystals were collected by filtration, repeatedly washed with THF until THF was not almost colored, and then dried under reduced pressure to give a quinone-amine compound used as a scale deposition preventing agent. As a result of the measurement by GPC, the average molecular weight of the compound was about 3500.

PREPARATION EXAMPLE 8

In 100 parts of DMAc was dissolved 0.7 part of the quinone-amine compound prepared in each Preparation Examples 1 to 7. The reduction reaction of the compound was conducted by adding 7 parts of 20% aqueous solution of sodium hydrosulfite and stirring the mixture for 5 hours at normal temperature under atmospheric pressure. The filtrate obtained by filtration of the reaction mixture was used as the applying solution in the following Examples.

COMPARATIVE PREPARATION EXAMPLE 1

A solution (A) was prepared by dissolving 0.8 part of tetraethylenepentamine, 0.5 part of p-phenylenediamine and 1.4 parts of p-aminobenzoic acid in 150 parts of ethanol (sp=12.7, ε=25.7).

Separately, a solution (B) was prepared by dissolving 4 parts of salicylaldehyde, 1 part of pyrogallol and 4 parts of hydroquinone in a mixed solvent of 45 parts of ethanol and 45 parts of demineralized water.

The solutions (A) and (B) were admixed and evaporated at nomal temperature under reduced pressure to dryness. As a result of the measurement by GPC, the average molecular weight of the quinone-amine compound obtained was less than 1800.

COMPARATIVE PREPARATION EXAMPLE 2

A solution (C) was prepared by di-ssolving 4 parts of p-phenylenediamine in 100 parts of demineralized water. Separately, a solution (D) was prepared by dissolving 4 parts of hydroquinone in 100 parts of demineralized water.

The solutions (C) and (D) were admixed, and then air was injected to the mixture to carry out the reaction. The reaction was terminated at a time when the salmon pink reaction mixture was darkened, and the reaction mixture was filtrated to give a muddy quinone-amine compound. As a result of the measurement by GPC, the average molecular weight of the compound was about 1800.

COMPARATIVE PREPARATION EXAMPLE 3

The procedures in Preparation Example 3 were repeated except that the reaction time was 2 days instead of 30 days. In the resulting reaction mixture, there was no precipitate of a crystal. The solution was used as the comparative applying solution in the following Comparative Example.

The reaction mixture was evaporated at normal temperature under reduced pressure to dryness to give a quinone-amine compound. As a result of the measurement by GPC, the average molecular weight of the compound was about 1800.

COMPARATIVE PREPARATION EXAMPLE 4

The procedures in Preparation Example 4 were repeated except that a mixed solvent of 40 parts of THF and 60 parts of methanol was employed instead of the mixed solvent of 50 parts of THF and 30 parts of methanol to give a quinone-amine compound having an average molecular weight of 2000.

COMPARATIVE PREPARATION EXAMPLE 5

The procedures in Preparation Example 4 were repeated except that the reaction time was 10 days instead of 30 days. In the resulting reaction mixture, there was no precipitate of a crystal.

The reaction mixture was evaporated at normal temperature under reduced pressure to dryness to give a quinone-amine compound. The average molecular weight of the compound was 1500.

COMPARATIVE PREPARATION EXAMPLE 6

A reaction vessel was charged with 100 parts of ethanol, and then 3 parts of β-naphthoquinone and 1 part of 1,8-diaminonaphthalene were added at 30° C. with stirring. The color of the mixture was changed to reddish black when 1,8-diaminonaphthalene was added. After stopping stirring, the reaction was proceeded by allowing the reaction mixture to stand for 4 days at 30° C. The precipitated crystals were collected by filtration, repeatedly washed with ethanol until ethanol was not almost colored, and then dried under reduced pressure to give a quinone-amine compound having an average molecular weight of about 700.

COMPARATIVE PREPARATION EXAMPLE 7

The procedures in Comparative Preparation Example 6 were repeated except that n-propyl acetate (sp=8.68, ε=6.69) was employed as the reaction medium instead of ethanol to give a quinone-amine compound having an average molecular weight of about 550.

COMPARATIVE PREPARATION EXAMPLE 8

The quinone-amine compound prepared in each Comparative Preparation Examples 4, 6 and 7 was subjected to the reduction treatment in the same manner as in Preparation Example 8.

EXAMPLE 1

The scale deposition-preventing agent shown in Table 1 was applied in the amount of 0.2 g/m$^2$ on the surfaces of the inner wall of the stainless steel polymerization vessel of 15 l and on the surfaces of the stirring blades and the buffle plates attached within the vessel. After drying, the vessel was charged with 4000 g of styrene-butadiene copolymer latex (solid content: 50%), 6000 g of demineralized water, 0.2 g of disodium ethylenediaminetetraacetate, 0.1 g of ferrous sulfate and 8 g of Rongalit, and then the temperature in the vessel was adjusted to 60° C. After addition of 400 g of 10% aqueous solution of potassium sulfate, the polymerization was carried out for three hours by adding 1600 g of methyl methacrylate containing 12 g of cumenehydroperoxide with 400 g thereof every 30 minutes to the reaction mixture. To the resulting reaction mixture was further added 8 g of cumenehydroperoxide, and then the polymerization was carried out for one hour. After completion of the polymerization, the obtained polymer was taken out of the vessel and the inside of the vessel was observed. The total amount of scale deposited on all the surfaces in each Experiment is shown in Table 1.

Each applying solution used in each Experiment Nos. 8 to 13 was prepared by dissolving the scale deposition preventing agent in a mixed solvent of DMAc-acetone (80:20 by volume, hereinafter the same) having a surface tension of 28.3 dyne/cm at 50° C. so that the concentration of the agent was 1.0 to 1.2%.

In Table 1, there are also shown the results of the whole judgement from viewpoints of thickness, uniformity and peeling property of the film formed, and contamination to the produced polymer latex.
O: Satisfying the above all judgements
Δ: Observing the contamination in product
X: Not satisfying the above judgements In addition, in each Table of this and the following Examples, Experiment No. marked with "*" represents a comparative experiment.

TABLE 1

| Experiment No. | Scale deposition preventing agent | Condition for drying | Amount of scale (g/m$^2$) | Whole judgement |
|---|---|---|---|---|
| *1 | A mixture of methyl-methoxysilicone oil and ferric chloride | 90° C. × 30 min | 510 | X |
| *2 | A mixture of methyl-hydrodiene polysiloxane oil and zinc octylate | 90° C. × 30 min | 230 | X |
| *3 | Anthraquinone. potassium disulfonate (pH 5.0) | 90° C. × 10 min | 280 | X |
| *4 | A mixture of sodium abietinate and calcium acetate (pH 5.5) | 90° C. × 30 min | 340 | X |
| *5 | 2-Mercaptoethanol | 90° C. × 60 min | 825 | X |
| *6 | Phenylphosphonic amide | 90° C. × 30 min | 680 | X |
| *7 | None | — | 660 | X |
| 8 | Reaction product of benzoquinone and phenylenediamine (Preparation Ex. 3) | 80° C. × 30 min | 13 | O |
| 9 | Reaction product of benzoquinone and diaminonaphthalene (Preparation Ex. 2) | 80° C. × 30 min | 8 | O |
| 10 | Reduced compound of reaction product of benzoquinone and phenylenediamine (Preparation Ex. 8) | 30° C. × 60 min under reduced pressure | 0 | O |
| 11 | Reaction product of phenanthraquinone and diaminonaphthalene (Preparation Ex. 5) | 30° C. × 60 min under reduced pressure | 2 | O |
| 12 | Reduced compound of reaction product of naphthoquinone and diaminonaphthalene (Preparation Ex. 8) | 80° C. × 30 min | 18 | O |
| 13 | Reaction product of naphthoquinone and diaminonaphthalene (Preparation Ex. 6) | 80° C. × 30 min | 40 | Δ |

EXAMPLE 2

The scale deposition preventing agent shown in Table 2 was applied in amount of 1.0 g/m$^2$ on the surfaces of the inner wall of the stainless steel polymerization vessel of 100 l. After drying, the vessel was charged with 25 kg of styrene-butadiene copolymer latex (solid content: 50%), 37.5 kg of demineralized water, 50 g of Rongalit, 1 g of disodium ethylenediaminetetraacetate and 0.5 g of ferrous sulfate, and then the temperature in the vessel was adjusted to 60° C. After addition of 2000 g of 10% aqueous solution of sodium chloride, 100 g of cumenehydroperoxide was dissolved in a mixture of 8250 g of methyl methacrylate and 4250 g of styrene. The polymerization was carried out for three hours by adding 3150 g of the above mixture to the reaction mixture every 30 minutes. To the resulting reaction mixture was further added 50 g of cumenehydroperoxide, and then the polymerization was carried out for two hours. After completion of the polymerization, the obtained polymer was taken out of the vessel and the inside of the vessel was observed. The total amount of scale deposited on all the surfaces in each Experiment is shown in Table 2.

As the solvent for application in each Experiment Nos. 21 to 25a, a mixed solvent of DMAc-isopropyl acetate (80:20) having a surface tension of 29.6 dyne/cm at 50° C. was employed. The concentration was adjusted to 1.0 to 1.2%.

TABLE 2

| Experiment No. | Scale deposition preventing agent | Condition for drying | Amount of scale (g/m²) | Whole judgement |
|---|---|---|---|---|
| *14 | Distearyl thiodipropionate | 90° C. × 30 min | 610 | X |
| *15 | Mercaptobenzoamidoazole | 90° C. × 30 min | 180 | X |
| *16 | Distearyl pentaerythritoldiphosphite | 90° C. × 30 min | 440 | X |
| *17 | 4-Methyl-6-cyclohexylphenol | 60° C. × 30 min | 970 | X |
| *18 | Di-tertiary-butyl-4-ethylphenol | 60° C. × 30 min | 1130 | X |
| *19 | Phenyl-α-naphtylamine | 66° C. × 30 min | 1200 | X |
| *20 | None | — | 580 | X |
| 21 | Reduced compound of reaction product of benzoquinone and diaminonaphthalene (Preparation Ex. 8) | 30° C. × 60 min under reduced pressure | 0 | O |
| 22 | Reaction product of phenanthraquinone and diaminobenzene (Same manner as in Preparation Ex. 5) | 30° C. × 60 min under reduced pressure | | O |
| 23 | Reduced compound of reaction product of phenanthraquinone and diaminonaphthalene (Preparation Ex. 8) | 30° C. × 60 min under reduced pressure | 0 | O |
| 24 | Reduced compound of reaction product of naphthoquinone and diaminonaphthalene (Preparation Ex. 8) | 30° C. × 60 min under reduced pressure | 3 | O |
| 25 | Reaction product of naphthoquinone and diaminonaphthalene (Preparation Ex. 6) | 30° C. × 60 min under reduced pressure | 8 | O |
| *25a | Reduced compound of reaction product of naphthoquinone and diaminonaphthalene (Comp. Preparation Ex. 4) | 30° C. × 60 min under reduced pressure | 90 | X |

EXAMPLE 3

The scale deposition preventing agent shown in Table 3 was applied in the amount of 0.5 g/m² on the surface of the inner wall of a stainless steel polymerization vessel of 8 l and on the surfaces of the stirring blades and the buffle plates attached within the vessel. After drying, the vessel was charged with 1875 g of polybutadiene polymer latex (solid content: 40%), 1875 g of demineralized water, 0.075 g of disodium ethylenediaminetetraacetate, 0.0375 g of ferrous sulfate and 3 g of Rongalit. At the temperature in the vessel of 60° C., the polymerization was carried out for two hours by continuously adding a mixture of 4.5 g of cumenehydroperoxide, 460 g of methyl methacrylate, 140 g of styrene and 150 g of acrylonitrile. To the resulting reaction mixture was further added 3 g of cumenehydroperoxide, and then the polymerization was carried out for two hours. After completion of the polymerization, the obtained polymer was taken out of the vessel and the inside of the vessel was observed. The total amount of scale deposited on all the surfaces in each Experiment is shown in Table 3.

The solvent for application employed in each Experiment Nos. 30 and 31 was the same as that in Experiment No. 8. The concentration was adjusted to 1.0 to 1.2%.

TABLE 3

| Experiment No. | Scale deposition preventing agent | Condition for drying | Amount of scale (g/m²) | Whole judgement |
|---|---|---|---|---|
| *26 | Silicone-modified epoxy resin to which a reaction product of benzoquinone and aminonaphthalene is added in the amount of 1% | 80° C. × 20 min | 460 | X |
| *27 | Sodium naphthylamine sulfonate (pH 4.5) | 90° C. × 10 min | 270 | X |
| *28 | 2-Aminobenzothiazole | 90° C. × 30 min | 480 | X |
| *29 | None | — | 720 | X |
| 30 | Reaction product of benzoquinone and diaminonaphthalene (Preparation Ex. 2) | 80° C. × 30 min | 11 | O |
| 31 | Reduced compound of reaction product of benzoquinone and diaminonaphthalene (Preparation Ex. 8) | 80° C. × 30 min | 0 | O |

EXAMPLE 4

The scale deposition preventing agent shown in Table 4 was applied in the amount of 0.5 g/m² on the surface of the inner wall of a stainless steel polymerization vessel of 8 l and on the surfaces of the stirring blades and the buffle plates attached within the vessel. After drying, the vessel was charged with 3000 g of demineralized water, 30 g of sodium dodecylbenzenesulfonate, 3 g of potassium persulfate, 1200 g of methyl methacrylate and 300 g of styrene, and then the polymerization was carried out at 70° C. for eight hours. After completion of the polymerization, the obtained polymer was taken out of the vessel and the inside of the vessel was observed. The total amount of scale deposited on all the surfaces in each Experiment is shown in Table 4.

The scale deposition preventing agents used in Experiment Nos. 40 and 41 were prepared in the same manner as in Preparation Example 5.

The solvent for application employed in each Experiment Nos. 38 to 41 was a mixed solvent of DMF-amyl acetate (80:20) having a surface tension of 26.9 dyne/cm at 50° C. The concentration was adjusted to 1.0 to 1.2%.

TABLE 4

| Experiment No. | Scale deposition-preventing agent | Condition for drying | Amount of scale (g/m²) | Whole judgement |
|---|---|---|---|---|
| *32 | Mixture of trifluoropropylmethylpolysiloxane and zinc octalate | 90° C. × 30 min | 805 | X |
| *33 | Chelating polymer | 90° C. × 30 min | 770 | X |
| *34 | Indene resin | 90° C. × 30 min | 640 | X |
| *35 | Pentaerythritol | 90° C. × 30 min | 330 | X |
| *36 | Sodium aminonaphthalene disulfonate (pH 6.5) | 90° C. × 30 min | 570 | X |
| *37 | None | — | 930 | X |
| 38 | Reduced compound of reaction product of benzoquinone and diaminonaphthalene (Preparation Ex. 8) | 50° C. × 60 min under reduced pressure | 0 | O |
| 39 | Reduced compound of reaction product of phenanthraquinone and diaminonaphthalene (Preparation Ex. 8) | 50° C. × 60 min under reduced pressure | 0 | O |
| 40 | Reaction product of benzoquinone and diaminoazobenzene | 50° C. × 60 min under reduced pressure | 5 | O |
| 41 | Reduced compound of reaction product of benzoquinone and diaminoazobenzene | 50° C. × 60 min under reduced pressure | 0 | O |

EXAMPLE 5

The scale deposition preventing agent shown in Table 5 was applied in the amount of 0.5 g/m² on the surfaces of the inner wall of a stainless steel polymerization vessel of 3 l. After drying, the vessel was charged with 800 g of demineralized water, 20 g of potassium oleate, 2 g of tripotassium phosphate, 0.4 g of Rongalit, 0.02 g of disodium ethylenediaminetetraacetate, 0.012 g of ferrous sulfate, 120 g of styrene, 280 g of 1,3-butadiene and 0.4 g of p-menthanehydroperoxide, and then the polymerization was carried out at 30° C. for 15 hours. To the resulting reaction mixture were added 800 g of demineralized water and 0.4 g of Rongalit, and the temperature in the vessel was adjusted to 60° C. After addition of 80 g of 10% aqueous solution of potassium sulfate, the polymerization was carried out for two hours by adding 120 g of methyl methacrylate containing 0.4 g of cumenehydroperoxide with 30 g thereof every 30 minutes to the reaction mixture. To the resulting reaction mixture was further added 0.8 g of cumenehydroperoxide, and then the polymerization was carried out for one hour. After completion of the polymerization, the obtained polymer was taken out of the vessel and the inside of the vessel was observed. The total amount of scale deposited on all the surfaces in each Experiment is shown in Table 5.

The solvent for application employed in Experiment No. 46 to 49 was a mixed solvent of DMF-n-butanol (70:30) having a surface tension of 25.7 dyne/cm at 50° C. The concentration was adjusted to 1.0 to 1.2%.

TABLE 5

| Experiment No. | Scale deposition preventing agent | Condition for drying | Amount of scale (g/m²) | Whole judgement |
|---|---|---|---|---|
| *42 | Sodium 7-amine-2-naphthylsulfonate | 80° C. × 30 min | 230 | X |
| *43 | Silicone-modified epoxy resin | 80° C × 30 min | 310 | X |
| *44 | Mixture of methylhydrodienepolysiloxane oil and zinc octylate | 90° C. × 30 min | 100 | X |
| *45 | Mercaptobenzomidoazole | 90° C. × 30 min | 200 | X |
| 46 | Reaction product of naphthoquinone and diaminonaphthalene (Preparation Ex. 1) | 80° C. × 30 min | 7 | O |
| 47 | Reaction product of benzoquinone and diaminonaphthalene (Preparation Ex. 2) | 80° C. × 30 min | 11 | O |
| 48 | Reaction product of benzoquinone and phenylenediamine (Preparation Ex. 3) | 80° C. × 30 min | 19 | O |
| 49 | Reduced compound of reaction product of naphthoquinone and diaminonaphthalene (Preparation Ex. 8) | 80° C. × 30 min | 0 | O |

EXAMPLE 6

The scale deposition preventing agent prepared in Preparation Example 6 was dissolved in an organic solvent having the surface tension at 50° C. as shown in Table 6, and then applied on the surface of the stainless steel test-piece (SUS304) buff polishing #320 (20×100 mm in size). After drying at 80° C. for 30 minutes, the condition of the formed film was observed and estimated with naked eyes and an optical microscope.

The above test-piece was fixed on a buffle plate in a stainless polymerization vessel of 100 l, and then the polymerization was carried out in the same manner and condition as in Example 2. After completion of the polymerization, the obtained polymer was taken out of the vessel and the surface of the test-piece was observed. The total amount of scale deposited on all the surfaces in each Experiment is shown in Table 6.

TABLE 6

| Experiment No. | Solvent (by volume) | Surface tension (dyne/cm at 50° C.) | Condition of formed film | Amount of scale (g/m²) | Whole judgement |
|---|---|---|---|---|---|
| *50 | DMAc | 35.5 | partially spotty | 27 | Δ |
| 51 | Morpholine/THF = 60/40 | 28.8 | uniform | 2 | O |
| 52 | DMAc/ethanol = 70/30 | 27.9 | " | 10 | O |
| 53 | DMAc/amyl acetate = 80/20 | 26.9 | " | 8 | O |
| 54 | Experiment No. 52 + benzoic acid (0.2 wt %) | 28.4 | " | 5 | O |
| 55 | Experiment No. 52 + sulfamic acid (0.2 wt %) | 27.5 | " | 3 | O |
| 56 | Experiment No. 52 + disodium ethylenediaminetetra- | 29.6 | " | 10 | O |

TABLE 6-continued

| Experiment No. | Solvent (by volume) | Surface tension (dyne/cm at 50° C.) | Condition of formed film | Amount of scale (g/m$^2$) | Whole judgement |
|---|---|---|---|---|---|
| | acetate (0.2 wt %) | | | | |

EXAMPLE 7

The scale deposition-preventing agent shown in Table 7 was applied in the amount of 0.5 g/m$^2$ on the surface of the inner wall of a stainless steel polymerization vessel of 15 l. After drying, the vessel was charged with 7000 g of demineralized water, 70 g of sodium dodecylbenzenesulfonate, 7 g of potassium persulfate, 2800 g of methyl methacrylate and 700 g of styrene, and then the polymerization was carried out at 70° C. for eight hours. After completion of the polymerization, the obtained polymer was taken out of the vessel. After washing the inside of vessel, the polymerization was repeated in the same manner as in the above-mentioned procedures. The number of the repeated polymerization at which polymer scale was formed in an amount of 1 g/m$^2$ was measured. The results are shown in Table 7.

The solvent for application employed in Experiment Nos. 58 to 60 was the same as that in Experiment No. 8. The concentration was adjusted to 1.0 to 1.2%.

TABLE 7

| Experiment No. | Scale deposition preventing agent | Condition for drying | Number of polymerizations |
|---|---|---|---|
| *57 | None | — | 0 |
| 58 | Reduced compound of reaction product of benzoquinone and phenylenediamine (Preparation Ex. 8) | 80° C. × 30 min | 5 |
| 59 | Reduced compound of reaction product of benzoquinone and diaminonaphthalene (Preparation Ex. 8) | " | 11 |
| 60 | Reduced compound of reaction product of phenanthraquinone and diaminonaphthalene (Preparation Ex. 8) | " | 9 |

EXAMPLE 8

The scale deposition preventing agent shown in Table 8 was applied in the amount of 0.5 g/m$^2$ on the surfaces of the inner wall of the stainless steel polymerization vessel of 3 l. After drying, the vessel was charged with 1150 g of styrene-butadiene copolymer latex (solid content: 30%), 650 g of demineralized water, 0.3 g of Rongalit, 0.02 g of disodium ethylenediaminetetraacetate and 0.01 g of ferrous sulfate, and then the temperature in the vessel was adjusted to 60° C. After addition of 150 g of 5% aqueous solution of potassium sulfate, the polymerization was carried out for one and a half hour by adding 150 ml of methyl methacrylate containing 0.4 ml of cumenehydroperoxide with 50 ml thereof every 30 minutes to the reaction mixture. To the resulting reaction mixture was further added 0.8 ml of cumenehydroperoxide, and then the polymerization was carried out for one hour. After completion of the polymerization, the obtained polymer was taken out of the vessel and the inside of the vessel was observed. The total amount of scale deposited on all the surfaces in each Experiment is shown in Table 8.

In Experiment No. 61, the application film was formed by mixing the solutions (A) and (B) prepared in Comparative Preparation Example 1, immediately applying to the inner surfaces of the vessel, drying for 30 minutes at 90° C., cooling and washing with water.

TABLE 8

| Experiment No. | Applying solution Scale deposition preventing agent | Organic solvent | Conc. (%) | Condition for drying | Amount of scale (g/m$^2$) | Condition of formed film | Color of polymer latex | Whole judgement |
|---|---|---|---|---|---|---|---|---|
| *61 | Comp. Preparation Ex. 1 | EtOH/water (194/45 by weight) | — | 90° C. × 30 min | 250 | peeled off | red | X |
| *62 | Comp. Preparation Ex. 2 | EtOH/water aqueous NaOH Solution (40/50/10 by weight) | about 3.8 | " | 190 | peeled off | " | X |
| *63 | Comp. Preparation Ex. 3 (non-reduced) | DMAc | 1.0 | 80° C. × 15 min under reduced pressure | 230 | peeled off | " | X |
| *64 | Comp. Preparation Ex. 4 (non-reduced) | " | 1.2 | 80° C. × 15 min under reduced pressure | 181 | peeled off | " | X |
| *65 | Comp. Preparation Ex. 5 (non-reduced) | " | " | 80° C. × 15 min under reduced pressure | 310 | peeled off | " | X |
| *66 | Comp. Preparation Ex. 6 (non-reduced) | " | " | 80° C. × 15 min under reduced pressure | 280 | peeled off | " | X |
| *67 | Comp. Preparation Ex. 7 (non-reduced) | " | " | 80° C. × 15 min under reduced pressure | 255 | peeled off | " | X |
| *68 | Comp. Preparation Ex. 4 (reduced) | " | " | 80° C. × 15 min under reduced pressure | 143 | peeled off | " | X |
| *69 | Comp. Preparation Ex. 6 (reduced) | " | " | 80° C. × 15 min under reduced | 290 | peeled off | " | X |

TABLE 8-continued

| Experiment No. | Applying solution Scale deposition preventing agent | Organic solvent | Conc. (%) | Condition for drying | Amount of scale (g/m$^2$) | Condition of formed film | Color of polymer latex | Whole judgement |
|---|---|---|---|---|---|---|---|---|
| *70 | Comp. Preparation Ex. 7 (reduced) | " | " | 80° C. × 15 min under reduced pressure | 280 | " | " | X |
| 71 | Preparation Ex. 1 (non-reduced) | " | 1.0 | 80° C. × 15 min under reduced pressure | 13 | uniform and not peeled off | milky | O |
| 72 | Preparation Ex. 2 (non-reduced) | " | 0.6 | 80° C. × 15 min under reduced pressure | 10 | uniform and not peeled off | " | O |
| 73 | Preparation Ex. 3 (non-reduced) | " | " | 80° C. × 15 min under reduced pressure | 21 | uniform and not peeled off | " | O |
| 74 | Preparation Ex. 4 (non-reduced) | " | 1.2 | 80° C. × 15 min under reduced pressure | 26 | uniform and not peeled off | " | O |
| 75 | Preparation Ex. 5 (non-reduced) | " | 0.6 | 80° C. × 15 min under reduced pressure | 4 | uniform and not peeled off | " | O |
| 76 | Preparation Ex. 6 (non-reduced) | " | 1.2 | 80° C. × 15 min under reduced pressure | 45 | uniform and not peeled off | Thin red | Δ |
| 77 | Preparation Ex. 7 (non-reduced) | " | " | 80° C. × 15 min under reduced pressure | 37 | uniform and not peeled off | " | Δ |
| 78 | Preparation Ex. 1 (reduced) | " | 1.0 | 80° C. × 15 min under reduced pressure | 0 | uniform and not peeled off | milky | O |
| 79 | Preparation Ex. 2 (reduced) | " | 0.6 | 80° C. × 15 min under reduced pressure | 0 | uniform and not peeled off | " | O |
| 80 | Preparation Ex. 3 (reduced) | " | " | 80° C. × 15 min under reduced pressure | 0 | uniform and not peeled off | " | O |
| 81 | Preparation Ex. 4 (reduced) | " | 1.2 | 80° C. × 15 min under reduced pressure | 15 | uniform and not peeled off | " | O |
| 82 | Preparation Ex. 5 (reduced) | " | 0.6 | 80° C. × 15 min under reduced pressure | 0 | uniform and not peeled off | " | O |
| 83 | Preparation Ex. 6 (reduced) | " | 1.2 | 80° C. × 15 min under reduced pressure | 32 | uniform and not peeled off | thin red | Δ |
| 84 | Preparation Ex. 7 (reduced) | " | " | 80° C. × 15 min under reduced pressure | 29 | uniform and not peeled off | " | Δ |

EXAMPLE 9

The procedures in Example 8 were repeated except that the solvent for application shown in Table 9 was employed. The results are shown in Table 9. The drying was conducted at 80° C. for 15 minutes under reduced pressure.

TABLE 9

| Experiment No. | Applying solution Scale deposition preventing agent | Organic solvent | Conc. (%) | Amount of scale (g/m$^2$) | Whole judgement |
|---|---|---|---|---|---|
| *85 | Preparation Ex. 1 (reduced) | Benzene | 0.3 | 190 | X |
| *86 | Preparation Ex. 1 (reduced) | Chloroform | 0.1 | 350 | X |
| *87 | Preparation Ex. 1 (reduced) | n-Butanol | 0.2 | 280 | X |
| *88 | Preparation Ex. 1 (reduced) | n-Amyl acetate | 0.1 | 460 | X |
| 89 | Preparation Ex. 1 (reduced) | DMAc | 1.0 | 0 | O |
| 90 | Preparation Ex. 1 (reduced) | DMF | 1.2 | 0 | O |
| 91 | Preparation Ex. 1 (reduced) | Pyridine | 1.0 | 0 | O |
| 92 | Preparation Ex. 1 (reduced) | Morpholine | 1.3 | 0 | O |
| 93 | Preparation Ex. 1 (reduced) | Dimethyl-sulfoxide | 1.2 | 0 | O |
| 94 | Preparation Ex. 4 (reduced) | DMF | 1.2 | 19 | O |
| 95 | Preparation Ex. 4 (reduced) | Acetonitrile | 0.6 | 27 | Δ |
| 96 | Preparation Ex. 4 (reduced) | Diethyl ketone | 0.5 | 31 | Δ |

In addition to the ingredients used in the Example, other ingredients can be used in the Example as set forth in the specification to obtain substantially the same results.

What we claim is:

1. In a process for emulsion-polymerizing an acrylate or a methacrylate monomer alone, a mixture thereof or a mixture of an acrylate or a methacrylate monomer as a main component and other copolymerizable monomers in the presence of water, an emulsifier and a polymerization initiator soluble in water or the monomers, wherein the amount of said acrylate monomer, methacrylate monomer or mixture thereof becomes not less than 60% by weight of the monomer mixture in the course of the emulsion polymerization; the improvement which comprises carrying out the emulsion polymerization in a polymerization vessel having a film on an inner surface thereof and on surfaces of attached instruments within the vessel, said film being formed by applying a solution of an aromatic quinone-amine compound having an average molecular weight of not less than 3,000 dissolved in an organic solvent, said quinone-amine compound being prepared by subjecting an aromatic diamine and an aromatic quinone to addition reaction in an organic solvent medium having a solubility parameter of 9.0 to 12.2 alone, a mixture thereof or a mixed medium of said organic solvent medium with an alcohol in an amount of the same or less than the weight of the organic solvent medium.

2. The process of claim 1, wherein the aromatic ring of said aromatic diamine is naphthalene ring.

3. The process of claim 1, wherein the aromatic ring of said aromatic quinone is benzene ring, naphthalene ring or phenanthrene ring.

4. The process of claim 1, wherein the quinone-amine compound to be applied is a quinone-amine compound which is subjected to reduction treatment in an aqueous medium or an organic medium.

5. The process of claim 1, wherein the solvent used for the application is removed by drying.

6. The process of claim 1, wherein the solvent medium used in the preparation of the quinone-amine compound has a dielectric constant of not less than 7.

7. The process of claim 1, wherein the solvent medium used in the preparation of the quinone-amine compound is tetrahydrofuran, dioxane, dimethylformamide, dimethylacetamide, acetonitrile, acetone, methyl ethyl ketone, dimethyl ketone, isobutyl ketone, methyl n-butyl ketone, methyl n-propyl ketone or a mixture thereof.

8. The process of claim 1, wherein the quinone-amine compound has an average molecular weight of not less than 6000.

9. The process of claim 1, wherein the solvent for dissolving the quinone-amine compound has a solubility parameter of 9.8 to 12.5.

10. The process of claim 9, wherein the solvent is a primary amide, a sulfoxide, a ketone, a nitrile compound, pyridine or morpholine.

11. The process of claim 1, wherein the emulsion polymerization is carried out in the presence of a polymerization activating agent.

12. The process of claim 1, wherein the addition reaction of the aromatic diamine and the aromatic quinone is carried out in the presence of ferric chloride.

* * * * *